United States Patent
Endo

(10) Patent No.: US 8,376,453 B2
(45) Date of Patent: *Feb. 19, 2013

(54) HOLLOW DOUBLE-WALLED PANEL AND INTERIOR PANEL FOR VEHICLE MADE USING SAME

(75) Inventor: Haruhiro Endo, Yamato (JP)

(73) Assignee: Kyoraku Co., Ltd., Kyoto-shi, Kyoto (JP)

(*) Notice: Subject to any disclaimer, the term of this patent is extended or adjusted under 35 U.S.C. 154(b) by 182 days.

This patent is subject to a terminal disclaimer.

(21) Appl. No.: 12/734,868

(22) PCT Filed: Nov. 28, 2008

(86) PCT No.: PCT/JP2008/071739
§ 371 (c)(1),
(2), (4) Date: May 27, 2010

(87) PCT Pub. No.: WO2009/069789
PCT Pub. Date: Jun. 4, 2009

(65) Prior Publication Data
US 2010/0308622 A1    Dec. 9, 2010

(30) Foreign Application Priority Data
Nov. 30, 2007 (JP) .................. 2007-311736

(51) Int. Cl.
*B60R 13/04* (2006.01)
(52) U.S. Cl. ....................................... 296/191
(58) Field of Classification Search ............ 296/11; 135/31; 264/512, 531
See application file for complete search history.

(56) References Cited

U.S. PATENT DOCUMENTS

| | | | | |
|---|---|---|---|---|
| 1,489,967 A * | 4/1924 | Robinson | ..................... | 114/65 A |
| 1,930,285 A * | 10/1933 | Robinson | ..................... | 138/143 |
| 1,996,490 A * | 4/1935 | Romanoff | ..................... | 428/178 |
| 3,733,849 A * | 5/1973 | Cantagallo et al. | ............. | 62/414 |
| 3,779,487 A * | 12/1973 | Ashton et al. | ............. | 244/123.5 |
| 3,811,810 A * | 5/1974 | Moller | ............. | 425/185 |
| 3,959,830 A * | 6/1976 | van den Broek | ............. | 52/287.1 |
| 4,079,903 A * | 3/1978 | Ashton et al. | ............. | 244/123.5 |
| 4,121,666 A * | 10/1978 | Rozniecki | ..................... | 169/62 |
| 4,251,579 A * | 2/1981 | Lee et al. | ............. | 428/73 |
| 4,769,968 A * | 9/1988 | Davis et al. | ............. | 52/798.1 |
| 5,033,147 A * | 7/1991 | Svensson | ............. | 14/73 |
| D332,148 S * | 12/1992 | Tal et al. | ..................... | D25/138 |
| 5,547,241 A * | 8/1996 | Villella et al. | ............. | 296/24.45 |

(Continued)

FOREIGN PATENT DOCUMENTS

| | | |
|---|---|---|
| JP | 57-118965 | 7/1982 |
| JP | 09-193656 | 7/1997 |

(Continued)

*Primary Examiner* — Kiran B Patel
(74) *Attorney, Agent, or Firm* — Flynn, Thiel, Boutell & Tanis, P.C.

(57) ABSTRACT

A double-walled hollow panel (A) has a first wall (21) and a second wall (22) which are made of thermoplastic resin and arranged separated from each other. Longitudinal inner ribs (11) and lateral inner ribs (12) arranged so as to cross the longitudinal inner ribs (11) are formed in a space (V) between the first and second walls (21, 22) so as to extend through the first wall (21) and be fusion bonded to the second wall (22). The longitudinal inner ribs (11) and the lateral inner ribs (12) are integrated together via crossing sections (13). Each crossing section (13) has a hole (H) not fusion bonded to the second wall (22), and the holes (H) interconnects adjacent small spaces.

5 Claims, 13 Drawing Sheets

U.S. PATENT DOCUMENTS

| | | | | |
|---|---|---|---|---|
| 5,758,467 | A * | 6/1998 | Snear et al. | 52/592.1 |
| 5,836,128 | A * | 11/1998 | Groh et al. | 52/580 |
| 6,079,175 | A * | 6/2000 | Clear | 52/404.1 |
| RE36,976 | E * | 12/2000 | Bezner | 52/563 |
| D451,612 | S * | 12/2001 | Thibault et al. | D25/119 |
| 6,324,796 | B1 * | 12/2001 | Heath | 52/177 |
| 6,949,282 | B2 * | 9/2005 | Obeshaw | 428/131 |
| 7,047,697 | B1 * | 5/2006 | Heath | 52/177 |
| 7,063,223 | B2 * | 6/2006 | Iwahara et al. | 220/6 |
| 7,127,865 | B2 * | 10/2006 | Douglas | 52/745.13 |
| 7,178,303 | B2 * | 2/2007 | Aota et al. | 52/582.1 |
| 7,596,924 | B2 * | 10/2009 | Sakae | 52/802.1 |
| 7,762,617 | B2 * | 7/2010 | Booher | 296/184.1 |
| 2010/0058959 | A1 * | 3/2010 | Endo | 108/57.25 |

FOREIGN PATENT DOCUMENTS

| | | |
|---|---|---|
| JP | 2000-158522 | 6/2000 |
| JP | 2001-170995 | 6/2001 |
| JP | 2002-210809 | 7/2002 |

* cited by examiner

HOLLOW DOUBLE-WALLED PANEL AND INTERIOR PANEL FOR VEHICLE MADE USING SAME

FIELD OF THE INVENTION

The present invention relates to a hollow double-walled panel with a ribbed structure that has a space inside and ribs formed in the space, and an interior panel for a vehicle made using the same.

BACKGROUND ART

There is a panel made of a synthetic resin now as a light and inexpensive plate-like member. Such a panel has a high versatility, and thus it is used for various purposes. For example, the panel may be used as a material for a sink or bathroom shelf utilizing its high corrosion resistance, or may be used as an interior panel for a vehicle utilizing its characteristic of a lightweight.

Further, in order to structurally increase the rigidity of the panel, there has been developed a panel with an inner rib, in which a reinforcing plate (so-called inner rib) is formed in a grid in a space between a front plate and a rear plate included by the panel (See Patent Literatures 1 to 3)

Patent Literature 1: Japanese Patent Application Laid-Open Publication No. 56-120319
Patent Literature 2: Japanese Patent Application Laid-Open Publication No. 57-118965
Patent Literature 3: Japanese Patent Application Laid-Open Publication No. 10-16079

DISCLOSURE OF THE INVENTION

Problem to be Solved by the Invention

Now, in the case of forming the above panel with an inner rib by means of blow molding, if an inner rib formed in a longitudinal direction (hereinafter referred to as "vertical inner rib") and an inner rib formed in a direction perpendicular to the vertical inner rib (hereinafter referred to as "horizontal inner rib") are formed such that they are coupled with each other in a cross shape, a parison is excessively stretched into being thin-walled at an intersecting portion, resulting in the rupturing of the parison or rather resulting in the lowering of the rigidity, what is worse, the flow of blowing air is blocked at a molding time to cause molding failure (see FIG. 6 of Patent Literature 1).

Therefore, it is possible to form the panel such that the vertical inner rib and the horizontal inner rib are not coupled with each other but are spaced from each other at a predetermined interval at the intersecting portion (see FIG. 4 of Patent Literature 2). However, in the case that the vertical inner rib and the horizontal inner rib are not coupled with each other but are spaced from each other, the rigidity of the panel in a bending direction is insufficient, and thus the panel cannot sufficiently obtain a reinforcing effect due to the inner ribs.

Therefore, it is also known to mold the intersecting portion, without using a slide mold, into a recessed rib (mounting hole), however, the problem that the base of the recessed rib is stretched into being thin-walled is not solved and, further, since the flow of blowing air (pressurized fluid) is blocked at the intersecting portion, a molding failure is caused, and thus molding itself is impossible when a plurality of intersecting portions are to be provided (see FIG. 3 of Patent Literature 3).

The present invention has been made to solve the above problems.

That is, it is an object of the present invention to provide a hollow double-walled panel in which there is no space formed between a vertical inner rib and a horizontal inner rib, but the vertical inner rib and the horizontal inner rib are continuously integrated with each other so that the bending rigidity of the panel is high.

Means Adapted to Solve the Problem

As a result of many hard studies of the present inventor(s) on the basis of such problems as described above, the present inventor(s) has(have) found that the above problems can be solved by coupling the vertical inner rib and the horizontal inner rib at their intersecting portion via a region, and the present inventor(s) has(have) made the present invention based on the finding.

That is, the present invention is (1) a hollow double-walled panel including a first wall and a second wall, which are made of thermoplastic resin and which are spaced from each other, wherein a vertical inner rib and a horizontal inner rib, which is arranged in a direction intersecting with the vertical inner rib, are formed in a space formed between the first wall and the second wall, by extending the first wall to fuse the same to the second wall, the vertical inner rib and the horizontal inner rib are integrated with each other via an intersecting portion, the space is partitioned into a plurality of small spaces, each small space being surrounded on all four sides by vertical inner ribs and horizontal inner ribs, and each small space communicates with at least one small space adjacent thereto via an opening portion formed at the intersecting portion.

The present invention is also (2) the hollow double-walled panel as described above (1), wherein the vertical inner rib, the horizontal inner rib and the intersecting portion have solid plate-like shapes.

The present invention is also (3) the hollow double-walled panel as described in the above (1), wherein a separate distance between the first wall and the second wall is 25 mm or less.

The present invention is also (4) the hollow double-walled panel as described in the above (1), wherein a sheet-like decorative member is integrally bonded to a surface of the second wall at a molding time.

The present invention is also (5) an interior panel for a vehicle, which is made using the hollow double-walled panel as described in any one of the above (1) to (4).

Incidentally, it is possible to employ a configuration obtained by combining the above inventions suitably, if the configuration can achieve the above object.

Effect of the Invention

Since the hollow double-walled panel of the present invention is formed such that both the vertical inner rib and the horizontal inner rib are reliably coupled with each other at the intersecting portion, the panel exhibits a higher bending rigidity than a conventional panel with an inner rib.

Since an opening portion is formed at the intersecting portion of the vertical inner rib and the horizontal inner rib, pressurized fluid can be spread throughout the plurality of small spaces which are surrounded by the vertical inner ribs and the horizontal inner ribs and which are adjacent to each other by blowing the pressurized fluid into a parison from at least one portion of the parison.

EXPLANATION OF REFERENCE NUMERALS

Figure 1:
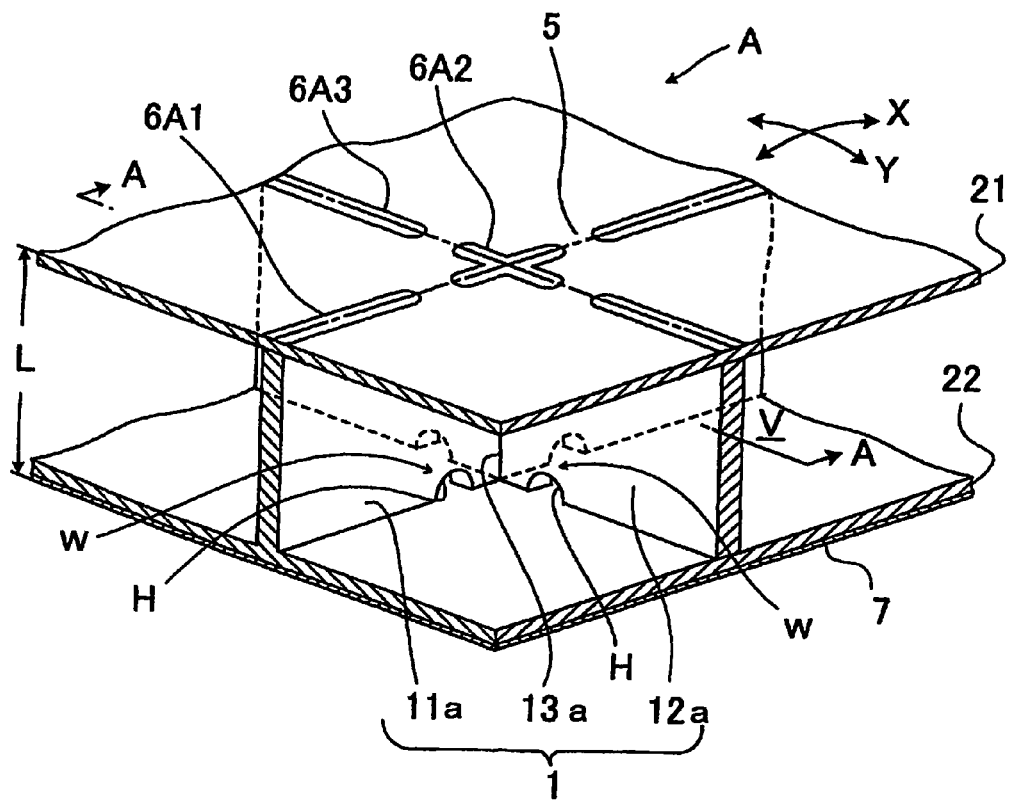
FIG. 1 is a perspective sectional view showing a hollow double-walled panel of this embodiment.

1: Inner rib
11*a*: Vertical inner rib
11*b*: Vertical inner rib
11*c*: Vertical inner rib
12*a*: Horizontal inner rib
12*b*: Horizontal inner rib
12*c*: Horizontal inner rib
13*a*: Intersecting portion
13*b*: Intersecting portion
13*c*: Intersecting portion
21: First wall
22: Second wall
3: Split type mold
3*a*: Slide core
3A: One split mold of split type mold
3A1: Vertical slide core
3B1: Vertical slide core
3C1: Vertical slide core
3A2: Cruciform slide core
3B2: Protruded piece
3A3: Horizontal slide core
3B3: Horizontal slide core
3C3: Horizontal slide core
4: Recessed portion
5: Folded wall line
6A1: Vertical-slide-core impression
6B1: Vertical-slide-core impression
6C1: Vertical-slide-core impression
6A2: Cruciform-slide-core impression
6B2: Horizontal-slide-core protruded-piece impression
6A3: Horizontal-slide-core impression
6B3: Horizontal-slide-core impression
6C3: Horizontal-slide-core impression
7: Decorative member
A: Hollow double-walled panel
H: Opening portion
P: Parison
V: Space
W: Region

BEST MODE FOR CARRYING OUT THE INVENTION

First Embodiment

A first embodiment of the present invention will be explained with reference to the drawings.

Figure 2:
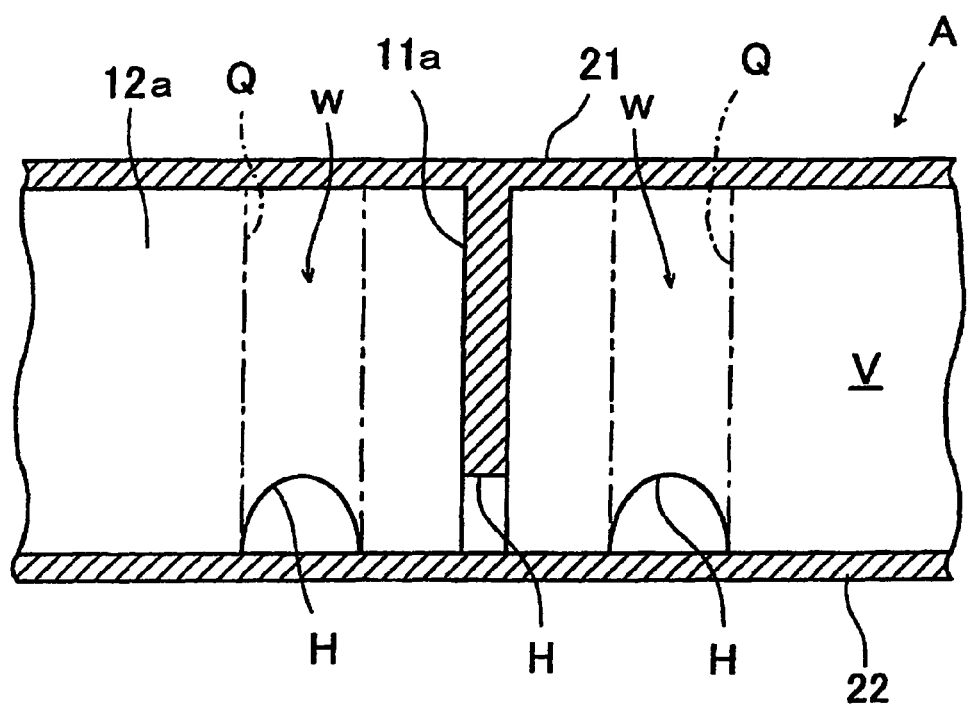
FIG. 2 is a sectional view of the hollow double-walled panel taken along the line A-A in FIG. 1.

FIG. 1 is a perspective sectional view for showing a ribbed structure of a hollow double-walled panel of this embodiment. Further, FIG. 2 is a sectional view of the ribbed structure taken along a line A-A in FIG. 1.

A hollow double-walled panel A of this embodiment is a plate-like member molded from thermoplastic resin, and it is versatilely utilizable owing to its high workability.

Though any thermoplastic resin may be employed as long as it can be blow-molded, desirably it is a polyolefin resin such as a polyethylene resin or polypropylene resin, or engineering plastic such as ethylene-vinyl acetate copolymer, vinyl chloride resin, ABS resin (acrylonitrile-butadiene-styrene resin), polyamide resin, polystyrene resin, polyester resin, polycarbonate resin, or modified polyphenylene ether and, more desirably, is a polypropylene resin in view of moldability when the inner ribs of the hollow double-walled panel are molded.

Incidentally, as a matter of course, it is possible to add such a filling material as glass fiber, carbon fiber, calcium carbonate, talc, or mica to the thermoplastic resin.

For example, the hollow double-walled panel A of this embodiment can be used for an interior panel for a vehicle (a deck board, a floor panel, a cargo floor lid, a rear parcel shelf, a tonneau board or the like), a casing of an office automation equipment or the like.

In the case of using the hollow double-walled panel of this embodiment as an interior panel for a vehicle, it is desirable to bond a decorative member 7 integrally to a second wall 22 of the hollow double-walled panel at a molding time.

The material of the decorative member is a sheet made of a nonwoven fabric, foam, woven fabric, knitted fabric, or synthetic resin.

As well as improving the appearance of the interior panel for a vehicle, the bonding of the decorative member makes the interior panel for a vehicle hard to scratch or the like on a surface of the interior panel for a vehicle.

Now, as shown in FIG. 1, a first wall 21 and the second wall 22 are spaced from each other by a predetermined distance in the hollow double-walled panel A, and thus a space V is formed between the first wall 21 and the second wall 22.

The space V is formed so that the hollow double-walled panel A is made much lighter as compared with its thickness and size.

Further, an inner rib 1 is formed in the space V so as to couple the first wall 21 and the second wall 22 with each other.

The inner rib 1 is formed in a grid in the whole space V, and therefore the hollow double-walled panel A exhibits a high rigidity against bending in a direction indicated by the arrow X, and against bending in a direction indicated by the arrow Y as well.

The inner rib 1 includes a vertical inner rib 11a, a horizontal inner rib 12a, and an intersecting portion 13a, and the vertical, inner rib 11a and the horizontal inner rib 12a are formed in mutually perpendicular directions.

The intersecting portion 13a is formed at a position where the vertical inner rib 11a and the horizontal inner rib 12a intersect with each other, and it has a region W that is positioned from the side of the first wall 21 in a solid plate-like manner and is not fused to an inner face of the second wall 22 at its distal end, and an opening portion H formed between the region W and the second wall 22. The vertical inner rib 11a and the horizontal inner rib 12a are continuous with each other via the intersecting portion 13a and integrated with each other.

Therefore, unlike conventional vertical inner ribs and horizontal inner ribs, a solid rib is continuously formed between the vertical inner rib 11a and the horizontal inner rib 12a of this embodiment by the region W having a solid plate-like shape without including a disconnection.

As a result, the hollow double-walled panel A can obtain a higher rigidity than a conventional panel with an inner rib.

The opening portion H is formed in an approximately semicircular shape on the side of the second wall 22 in the intersecting portion 13a.

Though the reason for producing the opening portion H will be explained later, formation of the opening portion H makes a pressurized fluid (blown air) spread throughout a hollow portion of the hollow double-walled panel A when the hollow double-walled panel A is produced by direct blow molding, and thus it is possible to produce the hollow double-walled panel A by blowing the pressurized fluid into the hollow portion from at least a portion of a parison.

In particular, though the space V is partitioned into a plurality of small spaces (cells) surrounded on all four sides by the vertical inner ribs 11a and the horizontal inner ribs 12a, the parison in the region W above the opening portion H is prevented from being excessively stretched into being thin-walled, since the opening portion H is formed at the intersecting portion 13a.

Therefore, molding failure due to rupturing of the parison does not occur.

Blown air can be distributed owing to the existence of the opening portion H without providing blowing means for each cell.

Further, in the vertical inner rib 11a and the horizontal inner rib 12a, the wall thickness of the region W above the opening portion H can be made thicker than the wall thickness of the rest (see the surrounding portion Q in FIG. 2.)

The region W thickened in this manner can compensate for a reduction in rigidity due to the opening portion.

Incidentally, though folded wall lines 5 corresponding to the inner rib 1 are formed on the surface of the first wall 21a in a grid manner, the positions of the folded wall lines 5 are sunk in the bottoms of the respective slide-core impressions by forming a vertical-slide-core impression 6A1, a cruciform-slide-core impression 6A2 and a horizontal-slide-core impression 6A3 that are shallow recessed grooves at positions corresponding to slide cores described later.

Therefore, the folded wall lines 5 do not project on the surface of the first wall 21, and thus the smoothness of the hollow double-walled panel A can be prevented from lowering.

The respective slide-core impressions are formed by performing molding in a state that slide cores have been slightly protruded from a cavity face of a mold when the slide cores have been retreated.

The folded wall lines 5 also intersect with each other approximately perpendicularly at a position corresponding to the intersecting portion 13a of the vertical inner rib 11a and the horizontal inner rib 12a.

Next, a producing method using direct blow molding will be taken as an example to explain a method of producing the hollow double-walled panel of this embodiment.

In the case of producing the hollow double-walled panel of this embodiment by blow molding, the inner rib is formed by protruding (pressing) slide cores with which a split type mold are provided into a parison before being injected with a pressurized fluid, and stretching the portions of the parison toward the insides of the parison.

Figure 3A:
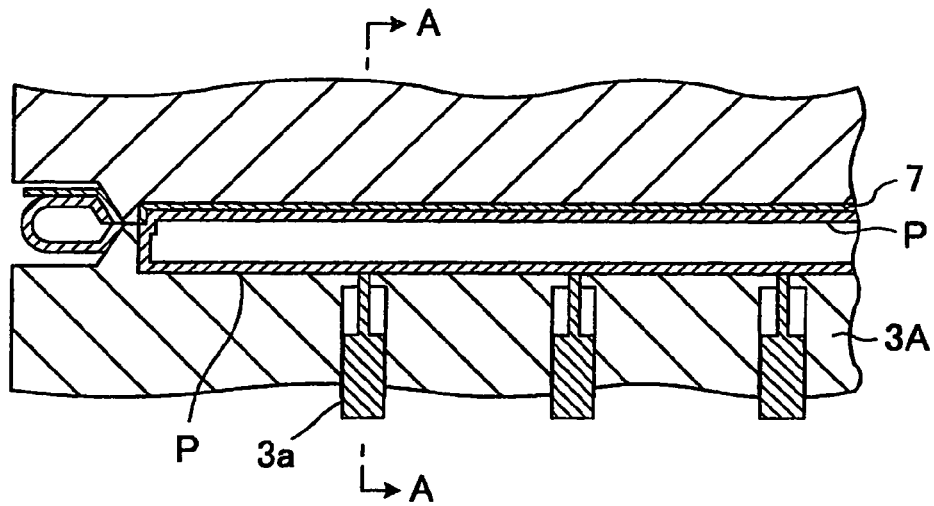
FIG. 3A, FIG. 3B and FIG. 3C are sectional views showing molding steps of the hollow double-walled panel according to the present invention.
Figure 4A:
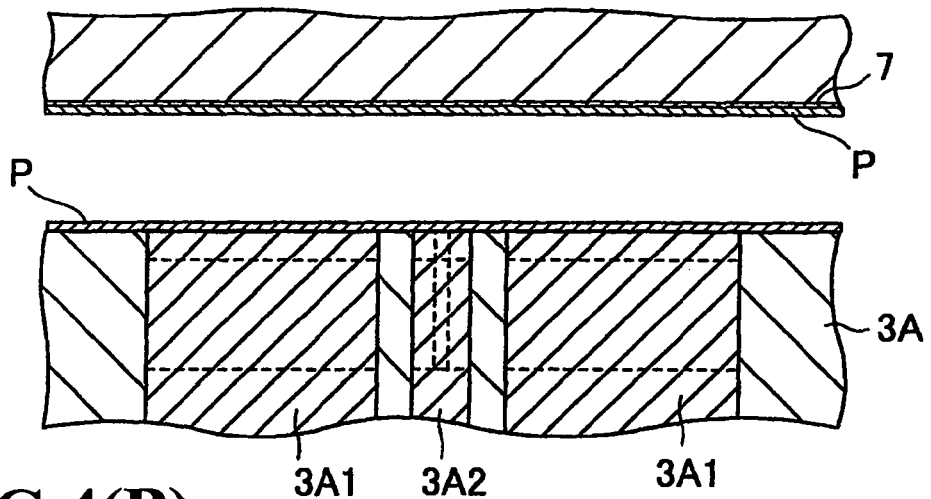
FIG. 4A, FIG. 4B and FIG. 4C are enlarged views of FIG. 3A, FIG. 3B and FIG. 3C, FIG. 4A being a sectional view of a molding step taken along the line A-A in FIG. 3A, FIG. 4B being a sectional view of a molding step taken along the line B-B in FIG. 3B, and FIG. 4C being a sectional view of a molding step taken along the line C-C in FIG. 3C.

A specific producing method is as follows:

First, a so-called mold clamping is performed such that a parison P extruded from a die (not shown) is sandwiched in its pre-blown state by a split type mold 3 in which a decorative member sheet made of nonwoven fabric is disposed (see FIG. 3A and FIG. 4A.)

Here, the split mold is designed such that the separate distance between the first wall and the second wall of the hollow double-walled panel is 25 mm or less.

In the case of using polypropylene resin as a material for the hollow double-walled panel, if the separate distance between the first wall and the second wall exceeds 25 mm, the parison P might rupture when the slide core described later is protruded into the parison P.

One mold 3A of the split type mold is provided with a slide core 3a for making a vertical inner rib, an intersecting portion and a horizontal inner rib.

The slide core 3a is a plate-like member which is a part of the mold and which is protruded from the cavity face and, in a normal state, is housed in the split type mold such that an end face of the slide core 3a and the cavity face are flush with each other.

Next, before the parison P becomes solidified, the slide core 3a is slowly protruded into the parison P until a part of the parison P that has been stretched (extended) by the slide core (hereinafter referred to as "extended portion") is brought into contact with an opposite wall face of the parison (see FIG. 3B and FIG. 4B.)

Incidentally, the timing at which the slide core is protruded into the parison can be set to any time before pressurized fluid is blown into the parison, and it is also possible to make adjustment such that the slide core is protruded from the cavity face of the split type mold at a mold-clamping time so that the slide core is brought into contact with the opposite wall face of the parison at the same time as the mold is clamped.

Figure 5:
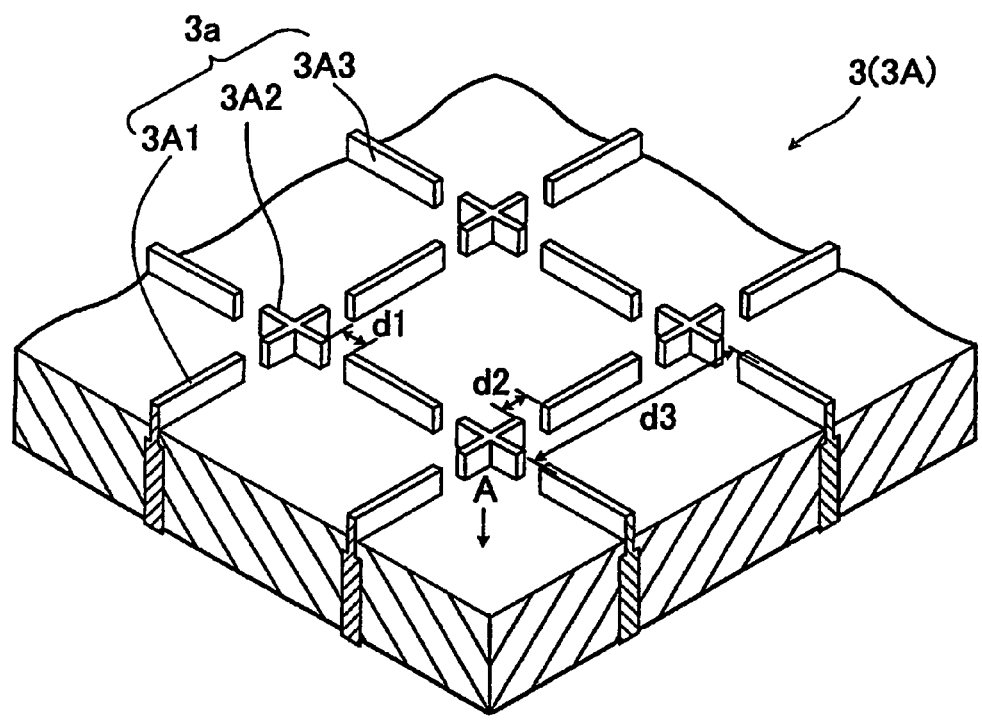
FIG. 5 is an explanatory view showing a configuration of a slide core.

Here, the slide core will be explained. FIG. 5 is a perspective view showing a configuration of the slide core.

As shown in FIG. 5, the slide core 3a includes a vertical slide core 3A1, a horizontal slide core 3A3 formed in a direction perpendicular to the vertical slide core 3A1, and a cruciform slide core 3A2.

The vertical slide core 3A1 is for forming the vertical inner rib 11a, the cruciform slide core 3A2 is for forming the intersecting portion 13a, and the horizontal slide core 3A3 is for forming the horizontal inner rib 12a.

The vertical slide cores 3A1 and the cruciform slide cores 3A2 are alternately arranged in line at a predetermined interval, likewise, the horizontal slide cores 3A3 and the cruciform slide cores 3A2 are also alternately arranged in line at a predetermined interval.

The lengths of the vertical slide core 3A1 and the horizontal slide core 3A3 desirably fall within a range from about 20 to 125 mm.

Also, the thicknesses of the vertical slide core 3A1 and the horizontal slide core 3A3 desirably fall within a range from about 1 to 7 mm.

The lengths of all four arms of the cruciform slide core 3A2 are desirably equal to each other, and further the lengths of these arms (protruded pieces) desirably fall within a range from about 2 to 10 mm.

Incidentally, when the thickness of the hollow double-walled panel is denoted by L, an interval d1 between the vertical slide core 3A1 and the cruciform slide core 3A2 is desirably set to satisfy d1<L. If the interval d1 is set to d1≧L, the hollow double-walled panel might be formed in a state that the vertical inner rib 11*a* and the intersecting portion 13*a* are not reliably coupled with each other. Likewise, regarding an interval d2 between the horizontal slide core 3A3 and the cruciform slide core 3A2, d2<L is desirable for the same reason as described above.

Further, regarding an interval between formations of the intersecting portions 13*a*, namely, an interval between formations of the cruciform slide cores 3A2 (formation pitch) d3, L<3d<5 L is desirable, and 2 L≦d3≦3 L is more desirable.

If the formation pitch d3 is shorter than L, the interval between cruciform slide cores 3A2 becomes excessively short so that the parison is excessively stretched, and thus molding failure is likely to occur.

Also, if the formation pitch d3 is longer than 5 L, the numbers of vertical inner ribs 11*a* and horizontal inner ribs 12*a* formed in the hollow double-walled panel A are reduced, and thus the rigidity of the hollow double-walled panel A is insufficient.

Then, end faces of these three slide cores are flush with each other, and with that state maintained, the slide cores are moved in parallel with each other in an integrated manner.

Incidentally, as long as the vertical inner rib 11*a* and the horizontal inner rib 12*a* are coupled with each other and the opening portion H is formed on the side of the second wall in the vicinity of the intersecting portion 13*a*, it is possible to lower the height of cruciform slide core 3A2 or eliminate the cruciform slide core 3A2 for the purpose of adjusting the shape of the intersecting portion 13*a*.

In this case, the intersecting portion 13*a* is unfused to the inner face of the second wall 22, but the intersecting portion 13*a* forms a folded wall in a cross shape to couple the vertical inner rib 11*a* and the horizontal inner rib 12*a* with each other, and the opening portion H is formed between the intersecting portion 13*a* and the second wall 22.

Figure 3B:
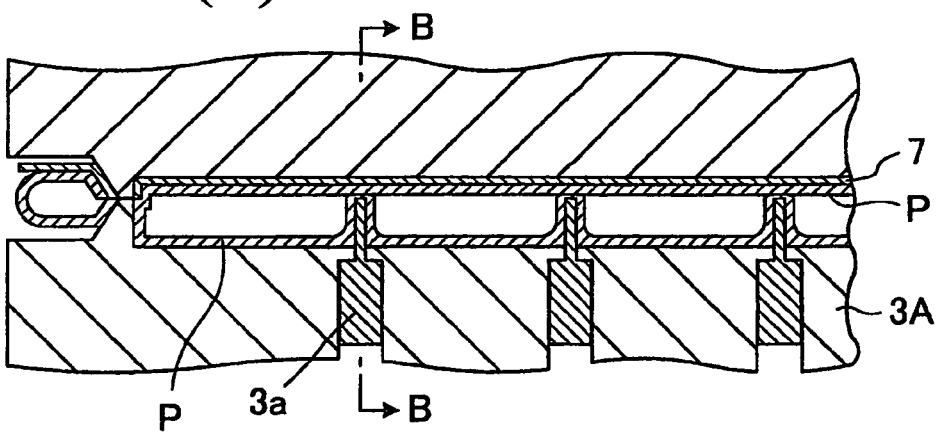
Figure 4B:
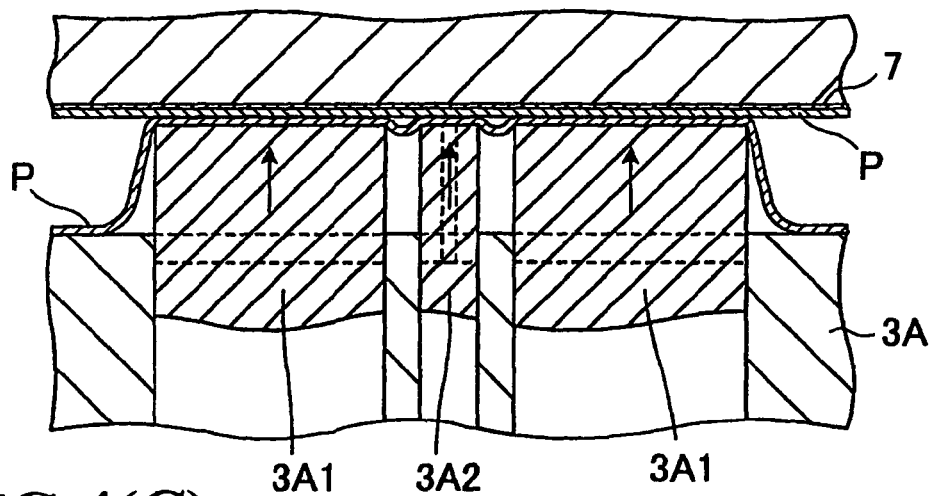

Since the vertical slide core 3A1 and the cruciform slide core 3A2 are arranged at a predetermined interval, a portion of the parison P, which is neither brought into contact with the vertical slide core 3A1 nor the cruciform slide core 3A2, is not directly molded by the slide cores but stretched accordingly, and thus it is not sufficiently stretched to be put in a relaxed state, as shown in FIG. 3B and FIG. 4B, so that it is unfused to the inner face of the second wall 22 and folded by the subsequent blowing of pressurized air into a so-called folded wall that forms a part of the inner rib.

As a result, the opening portion H is formed between a portion stretched by the vertical slide core 3A1 and a portion stretched by the cruciform slide core 3A2.

Then, the wall of the parison P on the side of the first wall above the opening portion H is thicker than that of the rest of the parison P.

Therefore, in a finished product state, the regions W (see the surrounded portion Q in FIG. 2) in the vertical inner rib 11*a* and the horizontal inner rib 12*a*, which are portions above the opening portions H, are thicker than the wall thickness of the rest. Of course, the region W is higher in rigidity than the rest.

Likewise, since the cruciform slide core 3A2 and the horizontal slide core 3A3, not shown, are arranged at a predetermined interval, the opening portion H is formed between a portion stretched by the horizontal slide core 3A3 and a portion stretched by the cruciform slide core 3A2 for the same reason as described above.

Figure 3C:
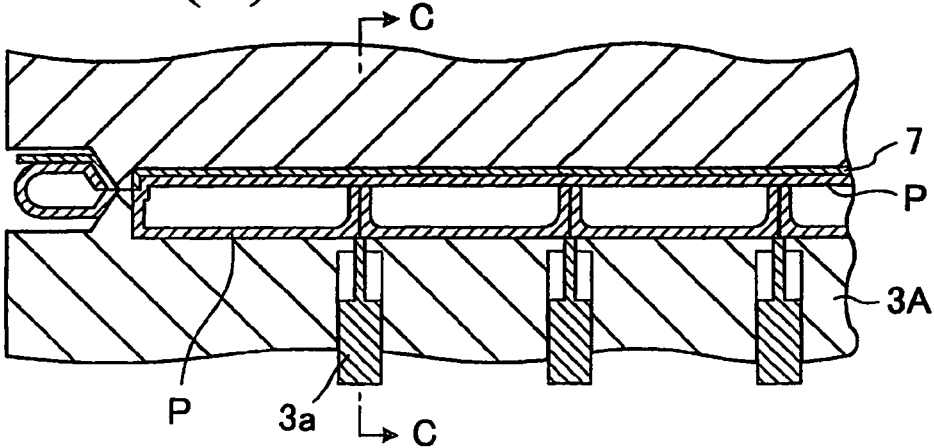
Figure 4C:
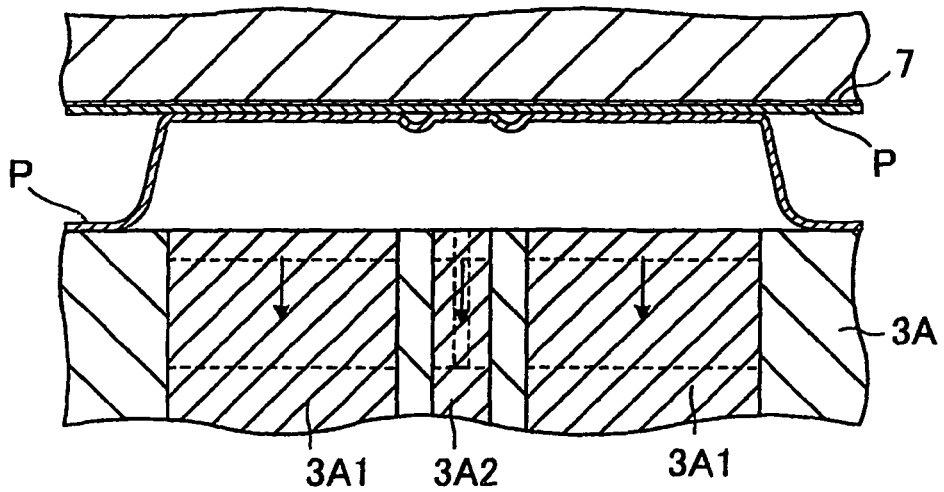

Now, after the extended portion is fused in an abutted manner to the wall face of the parison, the slide core 3*a* is withdrawn from the parison P, and the pressurized fluid is injected into the parison P to form the inner rib 1 (see FIG. 3C and FIG. 4C.)

The process of molding the inner rib 1 will be described in more detail.

Figure 6A:
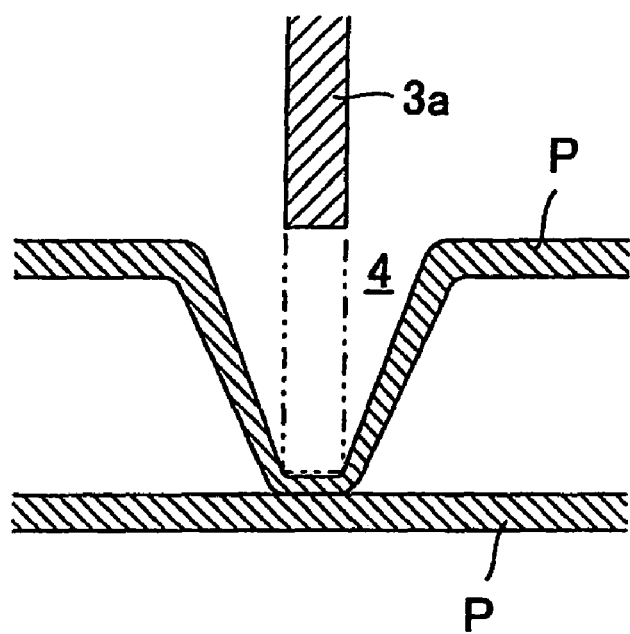
FIG. 6 is a sectional view showing a process of molding an inner rib.
Figure 6B:
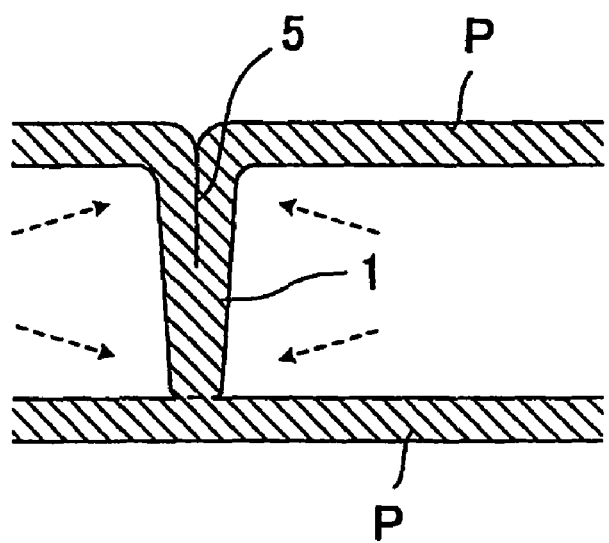

FIGS. 6A and 6B are sectional views showing the process of molding the inner rib, FIG. 6A showing the process after the slide core is withdrawn from the parison, and FIG. 6B showing the process after the pressurized fluid is injected in the parison.

As shown in FIG. 6A, when the slide core 3*a* has been withdrawn from the parison P, a recessed portion 4 is formed at a portion of the parison P into which the slide core 3*c* was protruded.

Then, approximately at the same time as the slide core 3*a* is withdrawn, the pressurized fluid is injected through a blowing port (blow pin) (not shown) stuck into the parison to inflate the parison P along the shape of the split type mold 3.

At this time, since the opening portions H (not shown) have been formed, only one blowing port provided is enough to spread the pressurized fluid throughout the parison P through the opening portions H.

When the pressurized fluid is injected into the parison P, the recessed portion 4 is closed by air pressure and fused to be solid, as shown in FIG. 6B, and thus the recessed portion 4 becomes the inner rib 1.

Describing more specifically, the recessed portion 4 formed by the vertical slide core 3A1 becomes the vertical inner rib 11*a*, the recessed portion 4 formed by the cruciform slide core 3A2 becomes the intersecting portion 13*a*, and the recessed portion 4 formed by the horizontal slide core 3A3 becomes the horizontal inner rib 12*a*.

After the pressurized fluid is injected into the parison P, the split type mold 3 is cooled down, and thus the vertical inner rib 11*a*, the horizontal inner rib 12*a*, and the intersecting portion 13*a* are hardened so that they are completely integrated with each other.

After the respective inner ribs are completely hardened, the split type mold 3 is opened, and the hollow double-walled panel A is ejected.

This completes the production of the hollow double-walled panel.

Second Embodiment

Next, another embodiment of the present invention will be explained with reference to the drawings.

Figure 8:
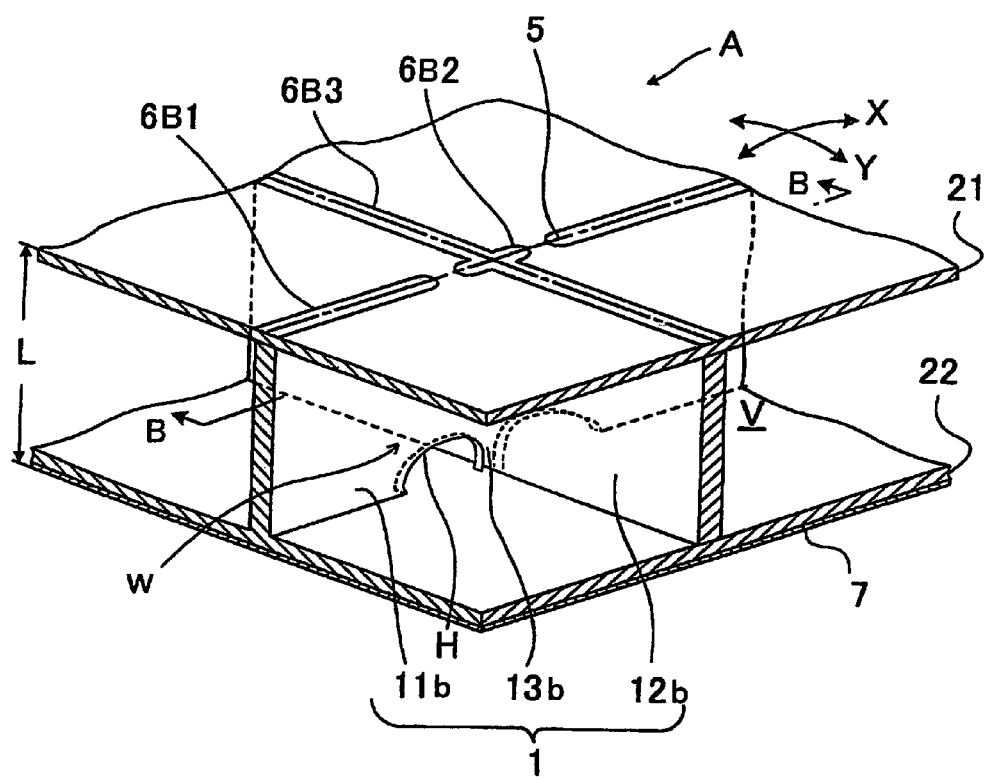
FIG. 8 is a perspective sectional view for showing a hollow double-walled panel according to another embodiment of the present invention.

FIG. 8 is a perspective sectional view showing a ribbed structure of a hollow double-walled panel of this embodiment.

Figure 9:
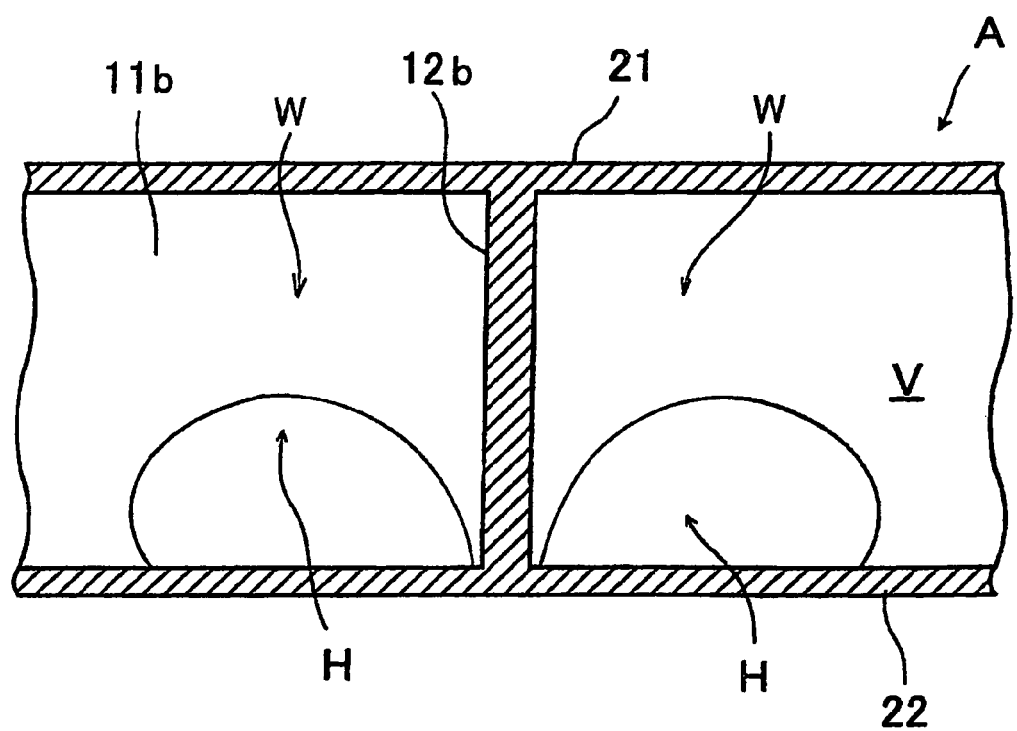
FIG. 9 is a sectional view of the hollow double-walled panel taken along the line B-B in FIG. 8.
Figure 10:
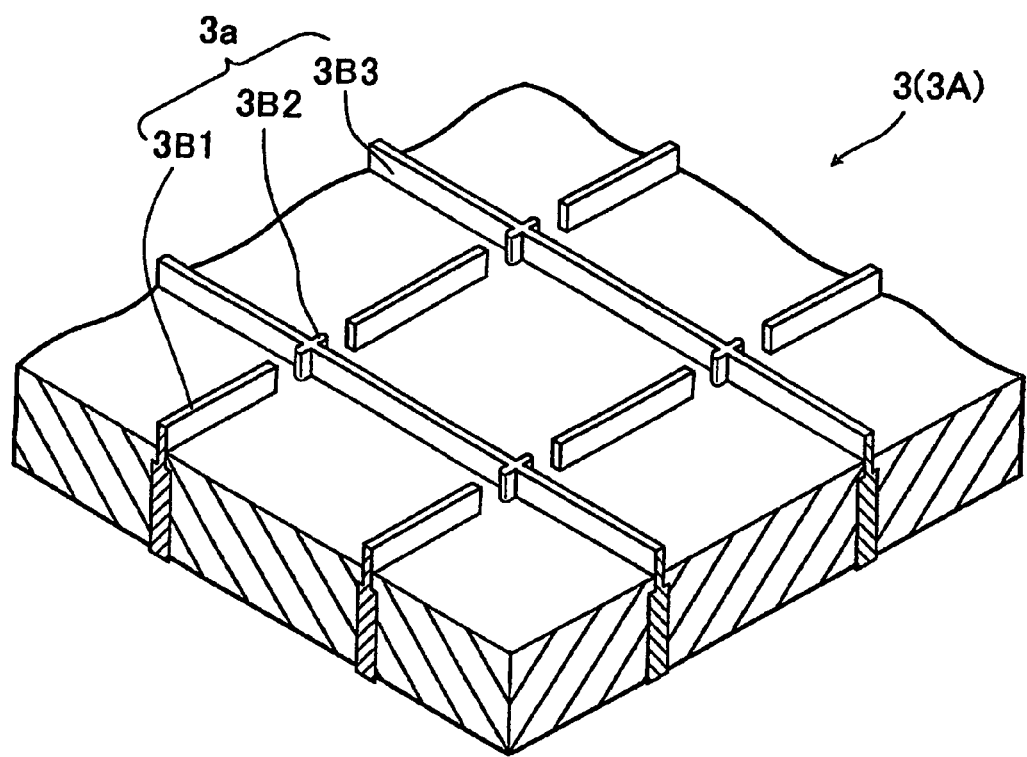
FIG. 10 is an explanatory view showing a configuration of a slide core for forming a ribbed structure according to another embodiment.

Further, FIG. 9 is a sectional view of the ribbed structure taken along the line B-B in FIG. 8. FIG. 10 is a perspective view showing a configuration of a slide core for forming the ribbed structure according to this embodiment.

As shown in FIG. 10, a slide core 3*a* includes a vertical slide core 3B1, a horizontal slide core 3B3 formed in a direction perpendicular to the vertical slide core 3B1 and, in place of the cruciform slide core of the first embodiment, a protruded piece 3B2 which is formed integrally with the horizontal slide core 3B3 and which slightly protrudes toward the vertical slide core 3B1. Therefore, the horizontal slide core 3B3 has a shape which is continuous without an interval at a position corresponding to the intersecting portion 13b.

The vertical slide core 3B1 forms a vertical inner rib 11b and the horizontal inner rib 3B3 forms a horizontal inner rib 12b. Then, only slightly protruded in length though it is, the protruded piece 3B2 protruding from the horizontal slide core 3B3 is a part required to form the region W for coupling both the inner ribs with each other at an intersecting portion 13b, and it functions to give a starting point of folding of the parison.

As for the rest, the arrangements, lengths and widths of the vertical slide core 3B1 and the horizontal slide core 3B3, the length of the protruded piece, an interval between the vertical slide core 3B1 and the distal end of the protruded piece 3B2, and an interval between formations of the protruded pieces 3B2 (formation pitch) can suitably be set similarly to the first embodiment.

Since the vertical slide core 3B1 and the distal end of the protruded piece 3B2 are arranged at a predetermined interval, the parison P is stretched according to the vertical slide core 3B1 and the protruded piece 3B2.

However, since the portion stretched accordingly is not sufficiently stretched to be relaxed, only the portion is not fused to the inner face of the second wall 22, so that the region W is formed by subsequent blowing of pressurized air.

Then, at the same time as formation of the region W, an opening portion H is formed between the region W and an inner face of the second wall 22.

In the hollow double-walled panel A according to this embodiment, as shown in FIG. 8, the inner rib 1 partitioning the space V into small spaces is formed so as to couple the first wall 21 and the second wall 22 with each other.

The inner rib 1 includes the vertical inner rib 11b, the horizontal inner rib 12b, and the intersecting portion 13b, and the vertical inner rib 11b and the horizontal inner rib 12b are formed in a grid in mutually perpendicular directions.

The intersecting portion 13b is formed at a position where the vertical inner rib 11b and the horizontal inner rib 12b intersect with each other, and it has the region W that is protruded from the side of the first wall 21 in a solid plate-like manner and is not fused to an inner face of the second wall 22 at its distal end, and an opening portion H formed into an approximately semicircle between the region W and the second wall 22. The vertical inner rib 11b and the horizontal inner rib 12b are continuous with each other via the intersecting portion 13b and integrated with each other.

The ribbed structure according to this embodiment is different from the first embodiment in that only two opening portions H are formed at positions that are approximately symmetrical with respect to the horizontal inner rib 12b.

Incidentally, the folded wall lines 5 corresponding to the inner rib 1 are formed in a grid shape on the surface of the first wall 21, and a vertical-slide-core impression 6B1, a horizontal-slide-core impression 6B3, and a horizontal-slide-core protruded-piece impression 6A2 which are shallow recessed grooves are formed at positions corresponding to the vertical slide core 3B1, the horizontal slide core 3B3, and the protruded piece 3B2.

Third Embodiment

Next, still another embodiment of the present invention will be explained with reference to the drawings.

Figure 11:
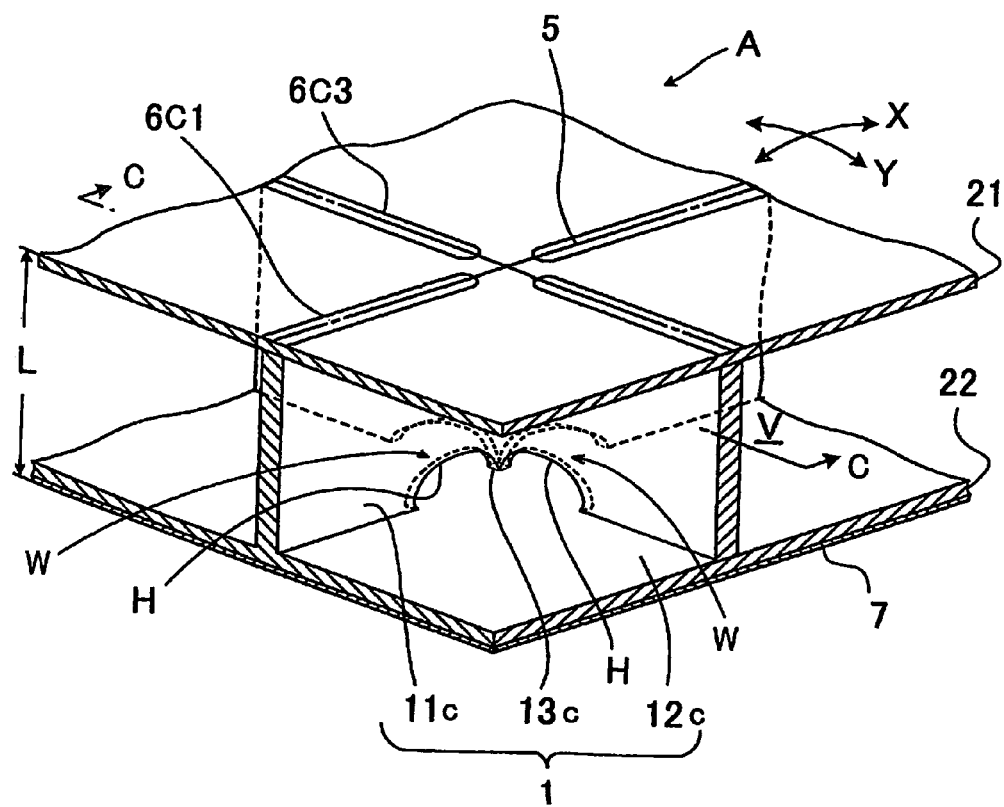
FIG. 11 is a sectional perspective view for showing a hollow double-walled panel according to still another embodiment of the present invention.

FIG. 11 is a perspective sectional view for showing a ribbed structure of a hollow double-walled panel of this embodiment.

Figure 12:
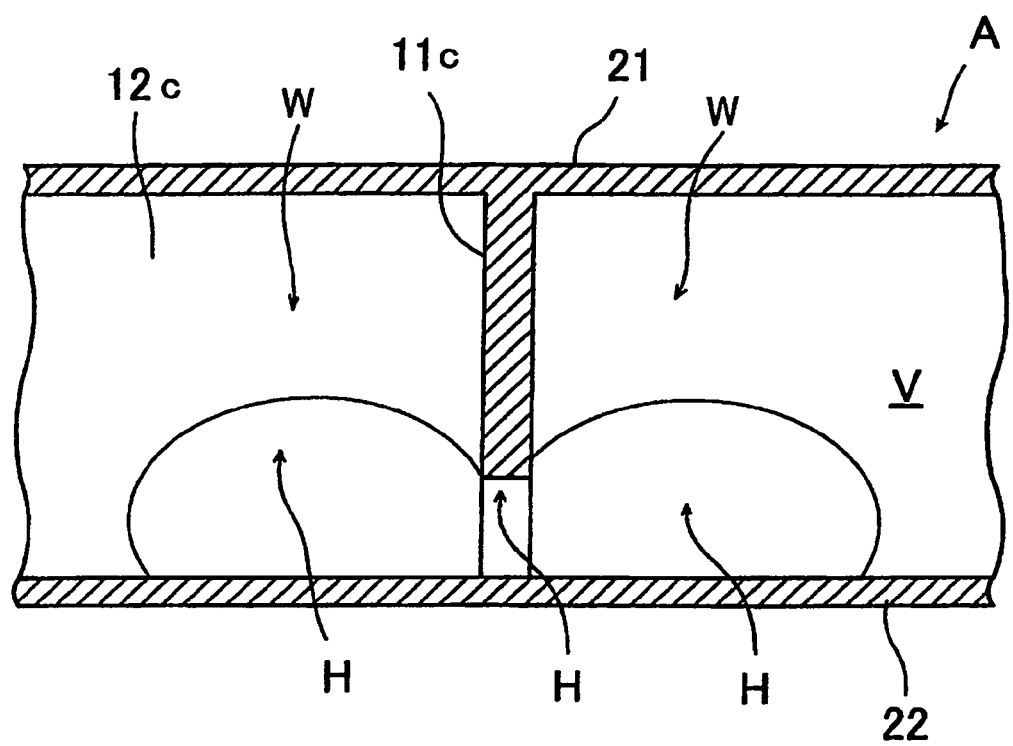
FIG. 12 is a sectional view of the hollow double-walled panel taken along the line C-C in FIG. 11.
Figure 13:
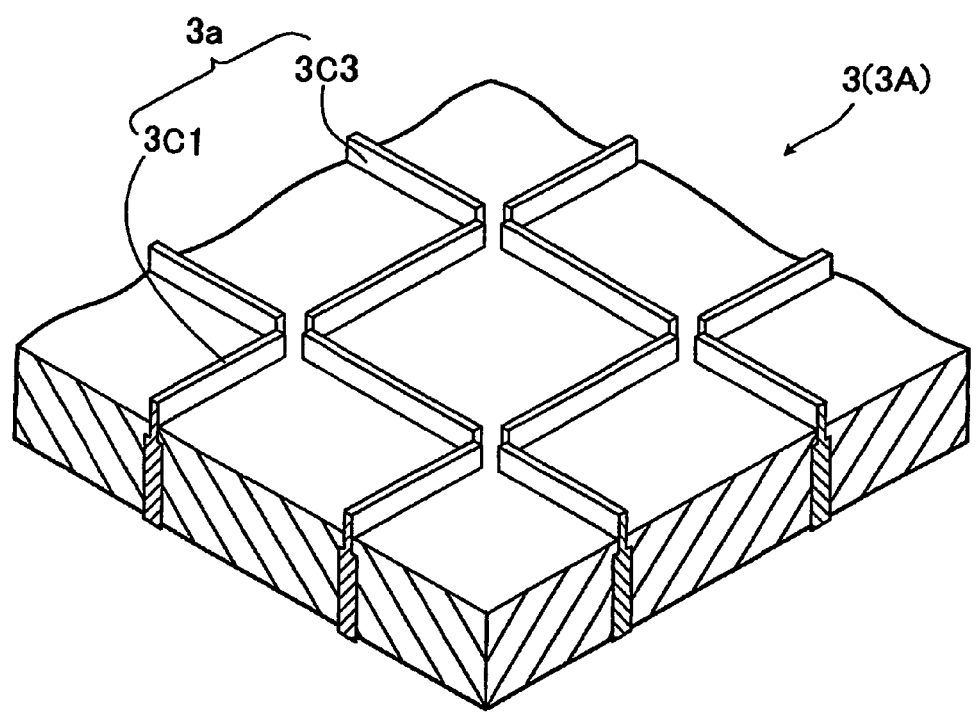
FIG. 13 is an explanatory view showing a configuration of a slide core for forming a ribbed structure according to still another embodiment.

Further, FIG. 12 is a sectional view of the ribbed structure taken along the line C-C in FIG. 11. FIG. 13 is a perspective view showing a configuration of a slide core for forming the ribbed structure according to this embodiment.

As shown in FIG. 13, a slide core 3a includes a vertical slide core 3C1 and a horizontal slide core 3C3 formed in a direction perpendicular to the vertical slide core 3C1, where the cruciform slide core in the first embodiment is omitted, and the vertical slide core 3C1 and the horizontal slide core 3C3 are arranged at a predetermined interval at a position corresponding to an intersecting portion 13c.

The vertical slide core 3C1 is for forming a vertical inner rib 11c, the horizontal slide core 3C3 is for forming a horizontal inner rib 12c, and the regions W for forming coupling both the inter ribs with each other are formed between two adjacent vertical slide cores 3C1 and between two adjacent horizontal slide cores 3C3.

As for the rest, the arrangements, lengths and widths of the vertical slide core 3C1 and the horizontal slide core 3C3 can suitably be set similarly to the first embodiment. Further, an interval between the vertical slide core 3C1 and the horizontal slide core 3C3 at the position corresponding to the intersecting portion 13c is desirably set within the range of 5 to 20 mm. If the interval is less than 5 mm, an opening portion is not formed, which results in wall thinning due to stretching of the parison and a molding failure due to blocking of the flow of the pressurized fluid blown into the parison. Further, if the interval is set at more than 20 mm, the vertical inner rib 11c and the horizontal inner rib 12c are not coupled with each other at the intersecting portion, which results in lowering of the rigidity.

Since the vertical slide core 3C1 and the horizontal slide core 3C3 are arranged at a predetermined interval at the position corresponding to the intersecting portion 13c, the parison P is stretched according to the vertical slide core 3C1 and the horizontal slide core 3C3.

However, a portion stretched accordingly is insufficiently stretched to be relaxed at a portion where the interval between the slide cores is positioned, so that only the portion is not fused to the inner face of the second wall 22 and the region W is formed by subsequent blowing of pressurized air.

Then, at the same time as formation of the region W, the opening portion H is formed between the region W and an inner face of the second wall 22.

In the hollow double-walled panel A according to this embodiment, as shown in FIG. 11, the inner rib 1 partitioning the space V into small spaces is formed so as to couple the first wall 21 and the second wall 22 with each other.

The inner rib 1 includes the vertical inner rib 11c, the horizontal inner rib 12c, and the intersecting portion 13c, and the vertical inner rib 11c and the horizontal inner rib 12c are formed in a grid shape in mutually perpendicular directions.

The intersecting portion 13c is formed at a position where the vertical inner rib 11c and the horizontal inner rib 12c intersect with each other, and it has the region W that is elevated from the side of the first wall 21 in a solid plate-like manner and is not fused to an inner face of the second wall 22 at its distal end, and an opening portion H formed into an approximately semicircle between the region W and the second wall 22. The vertical inner rib 11c and the horizontal inner rib 12c are continuous with each other via the intersecting portion 13c and integrated with each other.

The ribbed structure according to this embodiment is different from the first embodiment in that the opening portions Hare integrated with each other without being fused to the inner face of the second wall 22 at the intersecting portion 13c, and they are formed such that four adjacent small spaces communicate with each other.

As described above, in the ribbed structure formed in the hollow double-walled panel according to the present invention, the number of intersecting portions of the inner rib, the number of inner ribs, the thickness of the inner rib and the like are suitably set in accordance with the intended use of the hollow double-walled panel.

For example, in the case of using the hollow double-walled panel of each of the embodiments for an interior panel (1000 mm×500 mm) for a vehicle, inner ribs formed vertically and horizontally have 30 to 250 intersecting portions, the number of respective inner ribs is 4 to 30 and, as for the thicknesses thereof, it is only necessary to secure a thickness of about 1 to 5 mm.

Incidentally, the present invention can include various modified examples without being limited to the embodiments.

Figure 7:
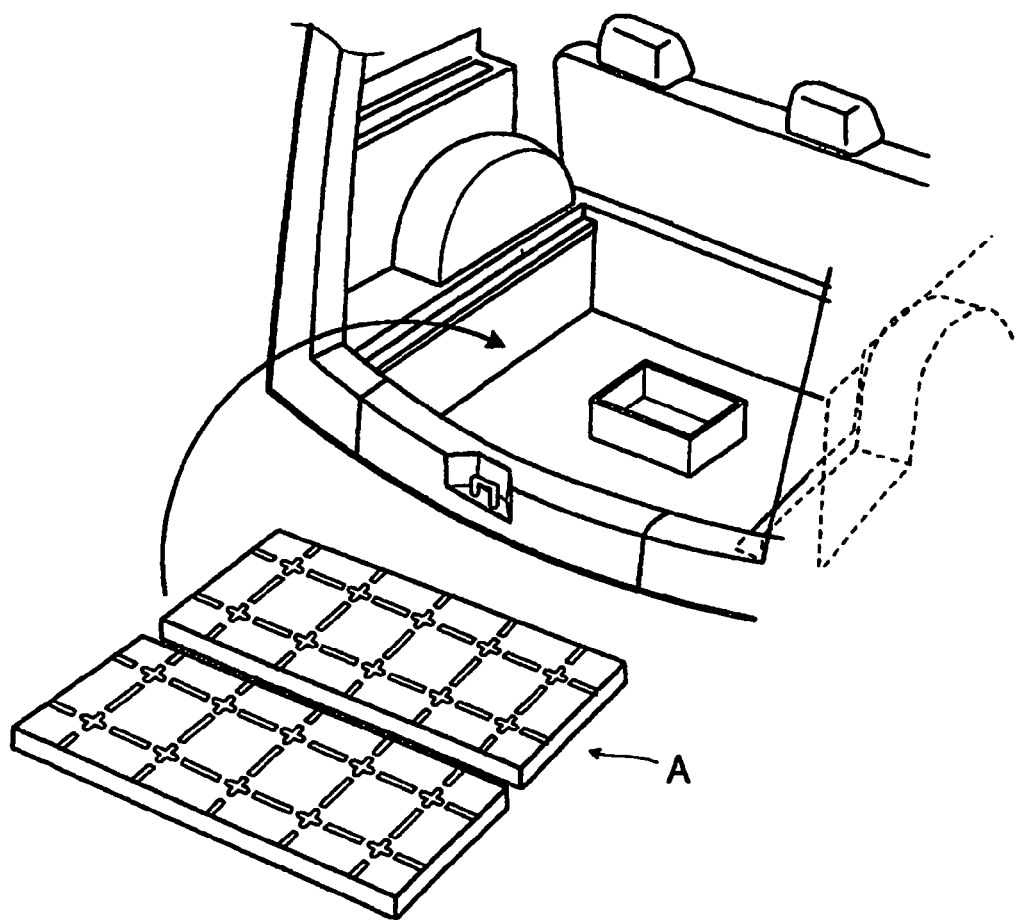
FIG. 7 is a view showing a usage aspect of an interior panel for a vehicle using the hollow double-walled panel of this embodiment.

Here, just for reference, a usage aspect of an interior panel for a vehicle using the hollow double-walled panel of the present invention is shown in FIG. 7.

In addition, though the slide core is provided in the split mold positioned on the side of the first wall in the case of the producing method described above, the slide core may be provided in the split mold positioned on the side of the second wall.

Further, by providing a strengthening member (so-called reinforcement) in a hollow double-walled panel produced, the rigidity of the panel can be further increased.

INDUSTRIAL APPLICABILITY

Since the hollow double-walled panel of the present invention is formed such that the vertical inner rib and the horizontal inner rib are reliably coupled with each other at the intersecting portion, the panel has the merit of exhibiting a higher rigidity than a conventional panel with an inner rib, so that it is extremely useful as an interior panel for a vehicle. However, the panel can be sufficiently applicable to a field other than for a vehicle, for example, a container, a building material and the like, as long as the panel is used for a portion requiring high bending rigidity.

The invention claimed is:

1. A hollow double-walled panel comprising a first wall and a second wall which are made of thermoplastic resin and which are spaced from each other, wherein
   a vertical inner rib and a horizontal inner rib, which is arranged to intersect perpendicularly with the vertical inner rib, are formed in a space formed between the first wall and the second wall, by extending the first wall to fuse with the second wall,
   the vertical inner rib and the horizontal inner rib are integrated with each other via an intersecting portion,
   the space is partitioned into a plurality of small spaces, each small space being surrounded on all four sides by vertical inner ribs and horizontal inner ribs, and
   each small space communicates with at least one other small space adjacent thereto via an opening portion formed at the intersecting portion.

2. The hollow double-walled panel according to claim 1, wherein the vertical inner rib, the horizontal inner rib and the intersecting portion have solid shapes.

3. The hollow double-walled panel according to claim 1, wherein a separate distance between the first wall and the second wall is 25 mm or less.

4. The hollow double-walled panel according to claim 1, wherein a sheet decorative member is integrally bonded to a surface of the second wall at a molding time.

5. An interior panel for a vehicle, which is made using the hollow double-walled panel according to claim 1.

* * * * *